United States Patent [19]

Miklos

[11] Patent Number: 4,562,504

[45] Date of Patent: Dec. 31, 1985

[54] MAGNETIC DISK JACKET AND FORMING PROCESS

[75] Inventor: Richard L. Miklos, Afton, Minn.

[73] Assignee: Minnesota Mining and Manufacturing Company, St. Paul, Minn.

[21] Appl. No.: 422,603

[22] Filed: Sep. 24, 1982

[51] Int. Cl.$^4$ ............................................. G11B 23/02
[52] U.S. Cl. ..................................... 360/133; 206/444
[58] Field of Search ............... 360/133; 206/309–313, 206/444

[56] References Cited

U.S. PATENT DOCUMENTS

| | | | |
|---|---|---|---|
| 3,301,467 | 1/1967 | Shore | 206/312 X |
| 3,668,658 | 6/1972 | Flores et al. | 340/174.1 |
| 3,864,755 | 2/1975 | Hargis | 360/133 |
| 4,038,693 | 7/1977 | Huffine et al. | 360/99 |
| 4,263,634 | 4/1981 | Chenoweth et al. | 360/133 |
| 4,277,810 | 7/1981 | Helmrich | 360/133 |
| 4,413,298 | 11/1983 | Pecsok | 360/133 |
| 4,417,291 | 11/1983 | Miklos | 206/444 X |

Primary Examiner—A. J. Heinz
Attorney, Agent, or Firm—Donald M. Sell; James A. Smith; David W. Anderson

[57] ABSTRACT

A method of forming a magnetic disk and jacket assembly and the jacket formed thereby. The jacket is formed from a precut sheet of material which is scored or perforated at the midpoint of its length to define a top panel and a bottom panel and around the edges of the bottom panel to define three flaps. The flaps are folded over and adhesively attached to the bottom panel to form a spacer surrounding an adhesive-free circular interior area and defining a central cylindrical cavity. After insertion of a magnetic disk into the cavity, the top panel is folded over and adhesively attached to the spacer. The three edges connecting the spacer and the bottom panel are trimmed to size to complete the assembly.

4 Claims, 5 Drawing Figures

MAGNETIC DISK JACKET AND FORMING PROCESS

BACKGROUND OF THE INVENTION

1. Technical Field of the Invention

This invention relates to protective envelopes and, particularly, to a new method for the manufacture of jackets for flexible magnetic disks, and the new disk jacket.

2. Description of the Prior Art

A flexible magnetic disk jacket encloses and protects a magnetic disk and is inserted along with the disk into a so-called disk drive which is connected to a computer system. The disk drive includes a read/write magnetic head which contacts the magnetic disk through openings in the jacket and either magnetically records information supplied by a computer system onto the disk or magnetically reads information from the disk and supplies such information to the computer system.

In order that information recorded upon a particular magnetic disk be readable in a variety of disk drives produced by various manufactures, certain standards for disk jacket flatness and dimensions have been developed. One such standard is the American National Standards Institute (ANSI) specification X3B8/78-145. Jackets which are not flat within allowable limits may be difficult to insert into the disk and also may cause data reliability problems due to head-to-disk contact instability and/or separation.

The present industry-accepted method of manufacturing a disk jacket is disclosed in U.S. Pat. No. 4,038,693, issued to Huffine et al., on July 26, 1977, and U.S. Pat. No. 4,263,634, issued to Chenoweth et al., on Apr. 21, 1981. These patents illustrate a disk jacket formed from a rectangular perimeter cut sheet which includes three envelope-type flaps extending from the three edges of one-half of the rectangular sheet. The centerline of the sheet is heated and folded to define top and bottom panels of the jacket and the two flaps adjacent this fold are in turn folded over the top panel and secured with an adhesive or by thermal bonding techniques or ultrasonic welding to form a pocket. The magnetic disk is inserted into this pocket and the flap opposite the initial centerline fold is folded over and likewise secured to contain the magnetic disk and form a completed jacket.

Although folded jackets may be produced rapidly by drawing on carton or envelope technology, problems associated with jackets produced in this manner are that the gap between the top and bottom panels and the thickness of the jacket are not uniform either because the edges of the jacket are pressed tightly together adjacent the folded flaps or because of distortion caused by prefold heating of the jacket material. Since the top and bottom panels are adjacent one another and forced together at three sides of the perimeter, there is a danger that the disk may be pinched between the panels and prevented from rotating freely if a uniform gap between these panels is not maintained. This may result in greatly increased rotational torque or destruction of the magnetic disk.

U.S. Pat. No. 3,864,755, issued to Hargis on Feb. 4, 1975, has attempted to overcome these problems by providing a disk jacket which has a relatively rigid, flat back cover and a relatively thin front cover which is thermoformed over the disk and bonded to the flat back cover. Nonwoven synthetic fiber wiper layers are interposed between the surfaces of the disk and the front and back covers to clean the disk and prevent the edge of the disk from becoming wedged in the junction of the front and back covers. A similar construction is shown in U.S. Pat. No. 3,668,658, issued to Flores et al., on June 6, 1972, in which the jacket is a composite of three sheets which include a central gasket layer surrounding the magnetic disk and adhesively attached to flat side panels.

While composite layer types of jackets are an improvement over folded jackets in that a uniform gap is provided in which the disk may freely rotate and the laminated structure increased rigidity and reduces distortion, they have not proven entirely successful in preventing the disk from becoming wedged in the junctions of the layers and have proven expensive because additional production steps are required to cut the layers and align the separate layers.

It would be desirable, therefore, to produce a jacket by folding a single sheet of material which provided a laminated structure and a definite, uniform gap for the disk between the outer jacket panels. Such a jacket would allow high production volumes and reduce the possibility of jacket distortion and consequential high disk rotational torque.

SUMMARY OF THE INVENTION

The present invention discloses a method of forming a disk jacket which produces a laminated jacket which includes an internal, side-separating spacer by folding a single sheet of material.

The jacket is formed from a single perimeter-cut sheet of material which is transversely scored or perforated at the midpoint of its length and along the three edges of one-half of the sheets to form a bottom panel, a top panel, and three flaps extending from the edges of the bottom panel. Adhesive is applied around the perimeter of the sheet and the three edge flaps are folded inwardly to produce a raised spacer attached to the bottom panel which defines a central cavity. A magnetic disk is then inserted into the cavity and the top panel is folded over and adhesively secured to the spacer. A final trimming procedure separates the flaps from the bottom panel and produces a laminated jacket which retains and protects the magnetic disk.

BRIEF SUMMARY OF THE DRAWINGS

The present invention will be more thoroughly described with reference to the accompanying drawings wherein like numbers refer to like parts in the several view, and wherein.

DETAILED DESCRIPTION OF THE INVENTION

The method of the present invention can be applied to various applications in which a relatively flat, warp-free folded article constructed from sheet material is desired. In particular, the method has been applied with success to the manufacture of a polyvinyl chloride (PVC) or paper flexible magnetic disk jacket in conformance with American National Standards Institute (ANSI) specification X3B8/78-145.

Figure 1:
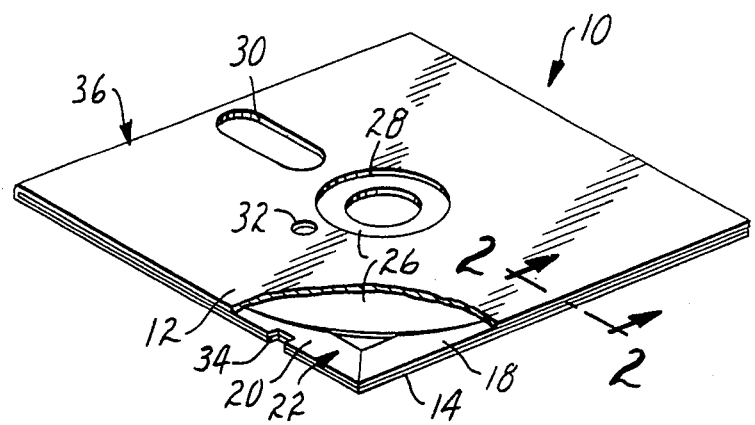
FIG. 1 is a perspective view of a magnetic disk and jacket assembly made according to the method of the invention having a section broken away to show the internal construction.

Referring now to FIG. 1, a flexible magnetic disk jacket is generally indicated as 10, and is square in external dimensions of either 5 and ¼ inches (113 mm) or 8 inches (203 mm). The jacket 10 need not be square, but is illustrated as such in accordance with the ANSI specification. As stated above, the jacket is preferably formed of PVC but may be formed of paper or a different polymeric material, such as polycarbonate, if so desired. The jacket 10 includes a top panel 12, a bottom panel 14 and edge flaps 16, 18 and 20 which have arcuate concave distal ends and are folded inwardly to produce a three-sided circumferential spacer 22 which defines a central generally cylindrical cavity 24. Located within the cavity 24 defined by the spacer 22 is a flexible magnetic disk 26 which may be used to record data provided by a computer system (not shown) or provide data which may be acted upon by the computer system. The disk 26 is conventional and need not be described herein.

The top panel 12 and the bottom panel 14 of the disk jacket 10 each have a central circular spindle access opening 28, a slotted head access opening 30 and a small circular sector index opening 32 offset from the center of the jacket 10.

The jacket 10 and the flexible disk 26 are adapted to be used with a disk drive (not shown) of the conventional type. The central circular openings 28 provide access to a spindle located within the disk drive which contacts the disk 26 and causes the disk 26 to rotate so that the magnetic recording process can be performed. The openings 30 provide for access of a magnetic recording transducer head (not shown) to the disk 26 and the openings 32 permit access of a photoelectric sector indexing device which is used to sense the rotational position of the magnetic disk 26 within the disk jacket 10. Adjacent an edge of the jacket 10 is a rectangular notch 34 which is used in conjunction with a sensor located in the disk drive to permit the recordation of data.

Figure 3:
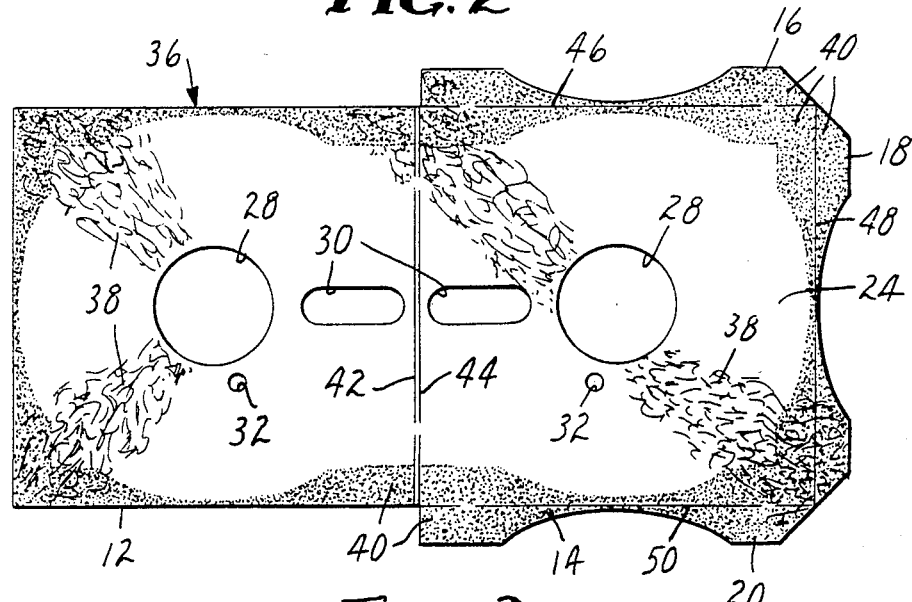
FIG. 3 is a planar view of the jacket blank of the assembly of FIG. 1 in an unfolded condition.

As shown in FIG. 3, the method of the present invention utilizes a single sheet of light gauge material of approximately 0.010 inches (0.25 mm) thickness which is perimeter cut to include the necessary top panel 12, bottom panel 14 and edge flaps 16, 18 and 20 which will be required in the subsequent folding operations.

Prior to the folding operation, however, the sheet 36 is preferably covered with a wiping fabric which may be a tissue-like woven or non-woven material of natural or synthetic fibers such as cotton, rayon or polypropylene fibers adhesively attached to the sheet 36, but is preferably a flocked-fiber cotton layer 38, which is made up of cotton fibers approximately 0.002 to 0.030 inches (0.05 to 0.8 mm) in length having one end bonded directly to the sheet 36 either by an adhesive or by solvent-bonding.

After application of the flocked layer 38, an adhesive 40, which may be a water or heat activated adhesive, is applied to the perimeter of the sheet 36 in an area determined by the shape of the edge flaps 16, 18 and 20, leaving the central cavity 24 in the shape of the magnetic disk 26 free of adhesive. After application of the adhesive 40, the sheet 36 is double scored or perforated along transverse lines 42 and 44 at the midpoint of its length, and is single scored or perforated along fold lines 46, 48 and 50 of one-half of the sheet 36 to form the edge flaps 16, 18 and 20.

It is preferred that the midpoint be scored rather than perforated to maintain the smoothness, stiffness, and integrity of the outer surface and that the flaps folds be perforated to substantially weaken the fold lines 46, 48 and 50 to facilitate production.

Figure 4:
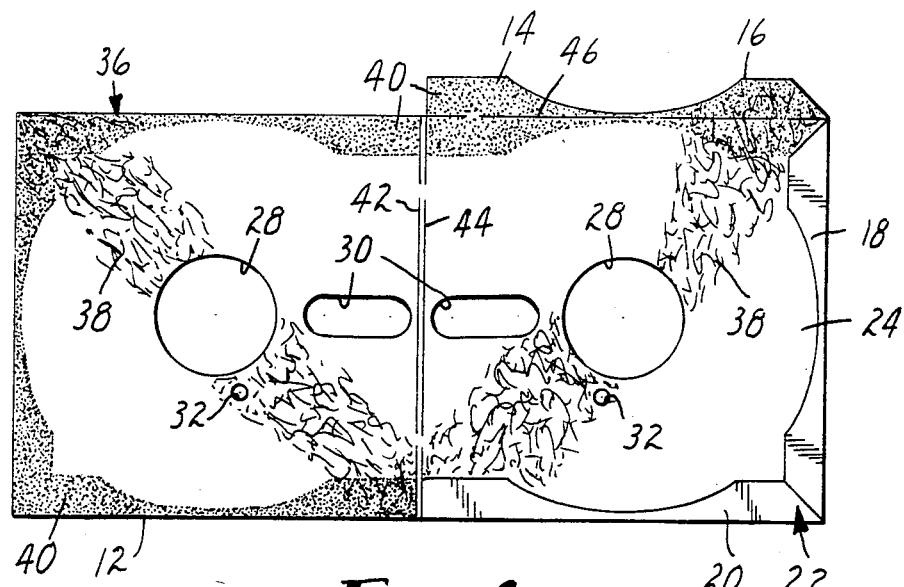
FIG. 4 is a planar view of the jacket blank of the assembly of FIG. 1 in a partially folded condition.
Figure 5:
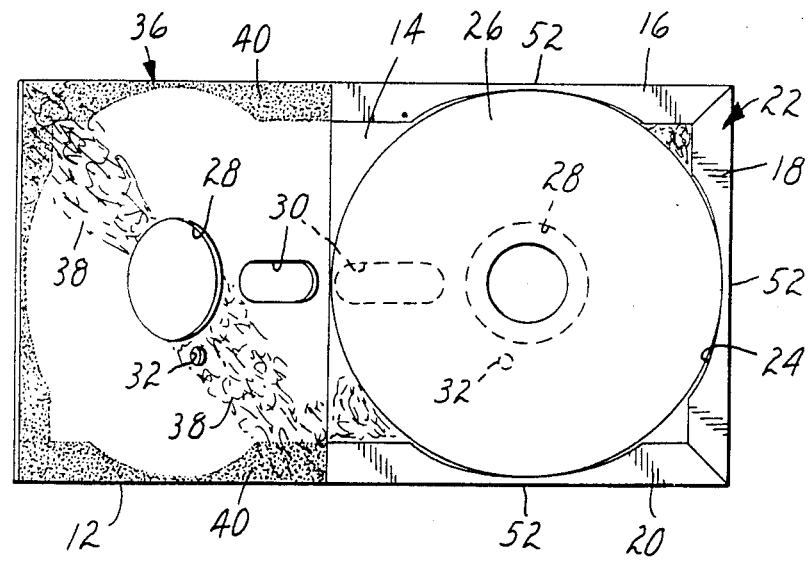
FIG. 5 is a planar view of the jacket blank in a partially folded condition with a flexible magnetic disk inserted.

FIG. 4 illustrates the initial step in folding the magnetic disk jacket 10, in which the adhesive 40 is activated and the edge flaps 16, 18 and 20 are folded over the bottom panel 14 to form a spacer 22 about a substantial portion of the perimeter of the bottom panel 14 and define the cavity 24 which is free of adhesive.

After the spacer 22 is formed, the magnetic disk 26 is inserted into the generally cylindrical cavity 24 defined by the distal edges of the now folded edge flaps 16, 18 and 20, and the top panel 12 is folded over and bonded by means of the adhesive 40 to the spacer 22.

As the final step, each of the three edges formed by folding flaps 16, 18 and 20 over the bottom panel 14 are trimmed to the final size of the jacket 10. The trimming operation removes material along the scored or perforated lines 46, 48 and 50 between the flaps 16, 18 and 20 and the bottom panel 14 and completely separates the flaps 16, 18 and 20 from the bottom panel 14 except, of course, for their connection through the adhesive 40. During the trimming operation, the notch 34 is cut into the margin of the jacket 10.

A summary of the steps necessary to produce a complete disk jacket assembly is that:

1. a sheet of material is cut having areas defined as a top panel, a bottom panel, and edge flaps extending from the bottom panel;
2. an adhesive is applied by zone coating around the perimeter of one major surface of the sheet;
3. the first, second and third flaps are folded over and adhesively secured to the bottom panel to form a spacer defining a central cavity;
4. a disk is inserted into the cavity;
5. the top panel is folded over and adhesively secured to the spacer; and
6. the jacket is trimmed along the three edges connecting the flaps to the bottom panel to separate the flaps from the bottom panel.

Since there is no remaining fold along the three edges of the jacket 10 which include the spacer 22, and because the midpoint is heavily scored 42 and 44, very small or no residual stresses remain in the material to wrap the magnetic disk jacket 10. The spacer 22 formed by folding the flaps 16, 18 and 20 on the inside of the jacket 10 produces a uniform separation of the panels 12 and 14 between which the magnetic disk can freely rotate. This produces a very low, consistent torque which is a qualitative improvement over existing jackets.

The torque necessary to rotate the disk is further controlled by shaping the cavity 24. Although the cavity 24 is illustrated and referred to as being generally cylindrical, in fact the radius of curvature of the flaps 16, 18 and 20 actually increases slightly from the midpoints 52 of the flap 16, 18 and 20 toward either end.

This ensures that the disk 26 will only contact the spacer 22 in small areas at the midpoints 52 of the flaps 16, 18 and 20 so that a large drag will not be induced on the disk 26.

Figure 2:
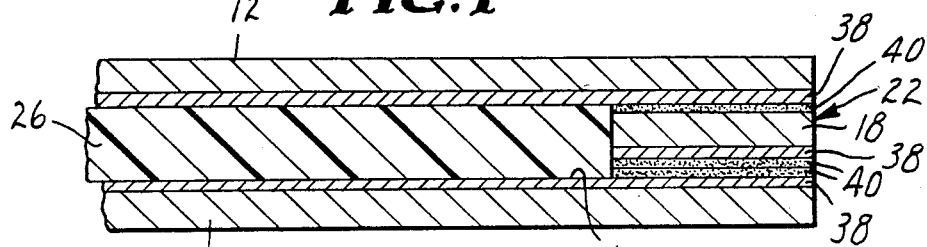
FIG. 2 is a greatly enlarged sectional view of a portion of the magnetic disk and jacket assembly taken generally along line 2—2 of FIG. 1.

As is best seen in FIG. 2, the separation of the panels 12 and 14 is determined by the thickness of the flocked layer 38 and the thickness of the spacer 22 which is the material thickness. Adjustment of these thicknesses will, therefore, permit selection of a desired separation between the panels 12 and 14.

Because the flaps 16, 18 and 20 are bonded on both surfaces to the top and bottom panels 12 and 14, a surprisingly strong and rigid laminated structure is produced which will reduce or eliminate warpage and may permit a thinner sheet 36 to be used which will reduce cost.

Further, since the edges of the jacket are not pinched together, the clearance between the disk 26 and the spacer 22 can be very small and the width of the spacer 22 at its smallest sections may be reduced to as little as 0.050 inches (0.125 mm). The small clearance will aid in centering the disk 26 in the jacket and, consequently, the disk drive.

Finally, it is contemplated that standard envelope or box making equipment, with slight alteration, may be used to perform the folding operations necessary to produce a finished jacket 10. Such equipment typically produces products at a rate greater than 500 parts per minute which is a substantial increase over present methods.

While the present invention has been described with reference to only a single embodiment, it is to be understood that the present invention is not limited to the specific means disclosed. It may be embodied in other ways that will suggest themselves to persons skilled in the art. It is believed that this invention is new and that any departures from the above description that come within the scope of the following claims are to be considered as part of the invention.

What is claimed is:

1. A method for forming a disk jacket assembly for a magnetic disk from a precut sheet or material having areas defined as a top panel, a bottom panel and a plurality of edge flaps extending from said bottom panel, comprising the steps of:

applying an adhesive around the perimeter of one major surface of said sheet, leaving a central area in the shape of said disk on said top and bottom panels free of adhesive;

folding said flaps to overlie said bottom panel to form a circumferential spacer adhesively secured to said bottom panel and surrounding said central area to define a central, generally cylindrical, cavity;

inserting a said disk into said cavity and onto said bottom panel central area;

folding said top panel to overlie and be adhesively secured to said spacer so that said disk is contained within said cavity and rotatable between said top and bottom panels; and trimming said assembly to finished dimensions by removing material from each of the three edges formed by folding said flaps over said bottom panel so that said bottom panel remains attached to said flaps only through said adhesive.

2. The jacket formed by the method of claim 1.

3. A method for forming a disk jacket assembly for a magnetic disk from a precut sheet of material precoated on one side with a wiping material, said sheet having areas defining a top panel, a bottom panel and a plurality of flaps extending from said bottom panel, comprising the steps of:

applying an adhesive to said wiping material around the perimeter of said sheet, leaving a central area of said top and bottom panels in the shape of said disk free of adhesive;

perforating or scoring said sheet along lines between said bottom panel and said flaps;

folding said flaps at said perforated or scored lines to overlie said bottom panel and form 180 degree flat folds at three edges of said bottom panel, said folded flaps producing a three-sided circumferential spacer surrounding said central area on said bottom panel to define a central, generally cylindrical, cavity;

scoring said sheet along parallel lines between said top and bottom panels;

inserting said disk into said cavity;

folding said top panel over said spacer to form two 90 degree folds at said scored lines and to contain said disk within said cavity between said top and bottom panels; and trimming to finished dimensions by cutting through the top panel, the spacer and the bottom panel along each of said 180 degree folds so that said bottom panel remains attached to said flaps only through said adhesive.

4. The jacket formed by the method of claim 3.

* * * * *